March 11, 1947.                J. W. RUNDT                 2,417,398
                      TAPERED ROLLER THRUST BEARING
                         Filed Dec. 29, 1945

INVENTOR:
John W. Rundt,
By Carr Van Gravely,
HIS ATTORNEYS.

Patented Mar. 11, 1947

2,417,398

UNITED STATES PATENT OFFICE 2,417,398

TAPERED ROLLER THRUST BEARING

John W. Rundt, Canton, Ohio, assignor to The Timken Roller Bearing Company, Canton, Ohio, a corporation of Ohio Application December 29, 1945, Serial No. 638,121

12 Claims. (Cl. 308—235)

This invention relates to roller bearings of the type designed for loads imposed in the direction of the axis of rotation and including conical antifriction rollers that taper towards said axis. The principal objects of the present invention are to provide rotary antifriction means for taking the outward axial thrust of the conical antifriction rollers when the bearing is under loads imposed in the direction of its rotary axis and to minimize the tendency for the rollers to skew or cant and to create a tendency for the rollers to right themselves in case they become cocked. Other objects are simplicity and cheapness of construction and compactness of design. The invention consists in the tapered roller thrust bearing and in the parts and combinations and arrangements of parts hereinafter described and claimed.

Figure 3:
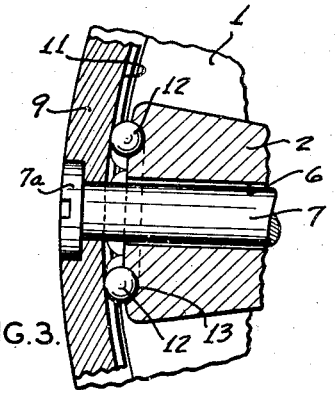
Figure 1:
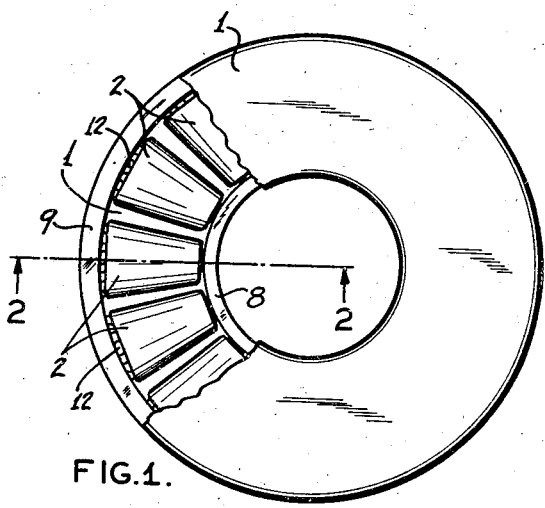
Figure 2:
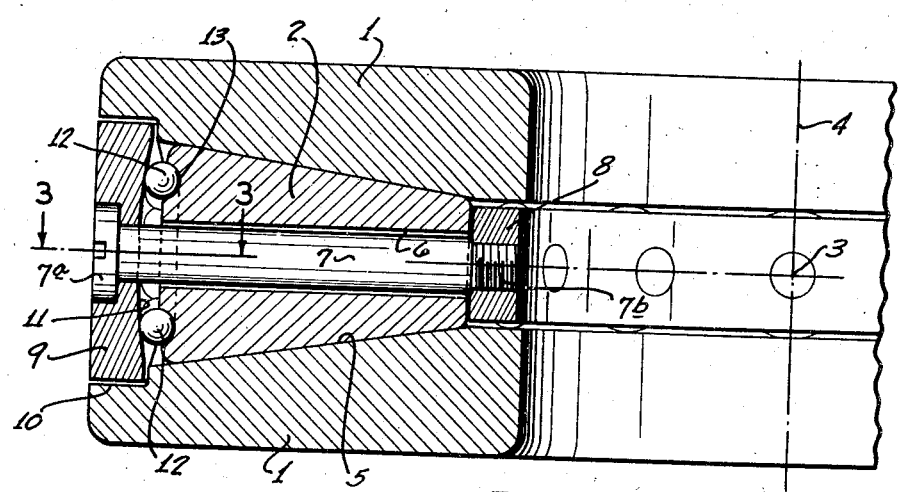
Figure 4:
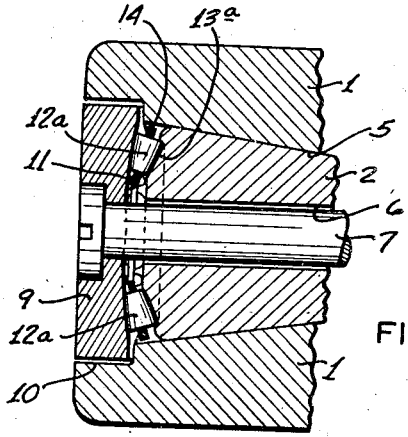

In the accompanying drawing, which forms part of this specification and wherein like symbols refer to like parts wherever they occur, Fig. 1 is an end elevational view of a tapered roller thrust bearing embodying my invention, a portion of one of the raceway members being shown broken away to disclose the antifriction rollers, Fig. 2 is an enlarged fragmentary sectional view on the line 2—2 in Fig. 1, Fig. 3 is a fragmentary sectional view on the line 3—3 in Fig. 2; and Fig. 4 is a view similar to Fig. 2, showing a modification of the invention.

The bearing shown in the accompanying drawing is a heavy duty tapered roller thrust bearing of the kind adapted for loads imposed in the direction of the axis of rotation of the bearing. Said bearing comprises two coaxial annular raceway members or rings 1 and a circular series of conical antifriction rollers 2 having a common apex 3 at the rotary axis 4 of the bearing and cooperating with conical raceways 5 provided therefor on the opposed faces of the race rings. The rollers 2 are axially bored as at 6 to loosely receive the radially disposed pins 7 of a cage or retainer including radially spaced concentric inner and outer rings 8 and 9, respectively, that are connected together by said pins.

The small inner ring 8 of the roller retaining cage is located between the annular raceway members 1 and opposite the small inner ends of the tapered antifriction rollers 2. The large outer ring 9 of the cage is located opposite the large outer ends of the rollers 2 and is loosely accommodated within annular rabbets or recesses 10 provided therefor in the opposed faces of the raceway members 1 at the outer ends of the conical raceways 5 thereon. The cage pins 7 extend through a line of radial holes provided therefor in the cage rings 8 and 9 and have heads 7a that seat in counterbores provided therefor in the radial holes of the outer ring and have their inner end portions 7b threaded into the radial holes in said inner ring, thereby securing said rings together and confining the antifriction rollers therebetween.

The large heavy outer thrust ring 9 of the cage has a spherically concave inner surface 11 whose center is at the common apex 3 of the antifriction rollers 2 on the rotary axis 4 of the bearing. Interposed between the outer end face of each antifriction roller 2 and the concave inner spherical surface 11 of said outer ring 9 is a circular series of rotary antifriction balls 12 that cooperate with said surface and an annular raceway 13 formed in said outer end face of said roller concentric with the axis thereof. The pins 7 serve to hold the cage rings 8 and 9 close enough together to maintain the balls in place between the outer cage ring 9 and the outer ends of the antifriction rollers 2.

As shown in Fig. 4, the antifriction elements between the outer end faces of the main antifriction rollers 2 and the large outer thrust ring 9 of the retaining cage may be in the form of conical rollers 12a having a spherical convex curvature corresponding to the spherically concave curvature 11 of the inner spherical surface of said ring, and the bottoms of the annular raceways 13a in the outer ends of said main rollers are curved in conformity with said convex spherical surfaces of said conical rollers. As shown in Fig. 4, a suitable retaining and spacing cage 14 is provided for each series of end thrust rollers 12a and forms therewith a self-contained unit.

By the arrangement described, the outward axial thrust on the conical rollers 2 of the bearing, due to the load imposed in the direction of the axis of rotation thereof, is transmitted to the heavy outer ring 9 of the roller retaining cage through the antifriction balls 12 or rollers 12a interposed between said ring and the large ends of said conical rollers, whereby outward movement of the conical rollers is prevented, friction is eliminated and wear reduced. The single concave spherical surface 11 on the inner periphery of the outer cage ring 9 provides a seat for the circular series of balls or rollers at the outer ends of all of the conical rollers 2. In operation, if any one of the load carrying conical main rollers 2 tends to skew or cant and thus concentrate the outward end thrust of said roller on one of the balls 12 or rollers 12a in the concave spherical seat 11 in the thrust ring 9, such outward end thrust will immediately center the series of balls or rollers of the end thrust bearing in said concave spherical seat and swing the misalined main roller back to proper running position. The annular clearance space between the rollers 2 and cage pins 7 prevents the canted or skewed rollers from binding on said cage pins.

What I claim is:

1. A roller thrust bearing comprising coaxial annular raceway members, a circular series of antifriction rollers therebetween and having their axes of revolution converging to a common apex at the axis of rotation of the bearing, a ring encircling the outer ends of said circular series of rollers and having an inner peripheral surface of a spherical concave curvature whose center is at said common apex, and rotary antifriction elements interposed between and cooperating with the outer end of said antifriction rollers and the spherically concave inner peripheral surface of said ring.

2. The combination set forth in claim 1 wherein a ring is located opposite the inner ends of said antifriction rollers and is connected to the ring which encircles the outer ends thereof.

3. The combination set forth in claim 1 wherein said antifriction rollers have bores extending axially therethrough, a ring is located opposite the inner ends of said antifriction rollers, and pins extend through said axial bores of said antifriction rollers and connect the rings at the outer and inner ends thereof.

4. A roller thrust bearing comprising coaxial annular raceway members, a circular series of antifriction rollers therebetween and having their axes of rotation converging to a common apex at the axis of rotation of the bearing, a ring encircling the outer ends of said circular series of rollers and having an inner peripheral surface of a spherical concave curvature whose center is at said common apex, and a series of rotary antifriction elements arranged in a circle concentric with each of said antifriction rollers and interposed between and cooperating with the outer end of said antifriction roller and the spherically concave inner peripheral surface of said ring.

5. A tapered roller thrust bearing comprising coaxial annular raceway members, a circular series of conical antifriction rollers therebetween and having a common apex at the axis of rotation of the bearing, a ring encircling the outer ends of said circular series of rollers and having an inner peripheral surface of a spherical concave curvature whose center is at said common apex, and a series of rotary antifriction elements arranged in a circle concentric with each of said antifriction rollers and interposed between and cooperating with the outer end of said antifriction roller and the spherically concave inner peripheral surface of said ring.

6. The combination set forth in claim 5 wherein a ring is located opposite the inner ends of said antifriction rollers and is connected to the ring which encircles the outer ends thereof.

7. The combination set forth in claim 5 wherein said antifriction rollers have bores extending axially therethrough, a ring is located opposite the inner ends of said antifriction rollers, and pins extend through said axial bores of said antifriction rollers and connect the rings at the outer and inner ends thereof.

8. The combination set forth in claim 5 wherein said antifriction elements are in the form of balls and the outer ends of said conical rollers have annular raceways formed therein for said balls.

9. The combination set forth in claim 5 wherein said antifriction elements are in the form of said antifriction rollers and annular raceways are provided therefor in the outer ends of said conical rollers.

10. A tapered roller thrust bearing comprising coaxial annular raceway members, a circular series of conical antifriction rollers therebetween and having a common apex at the axis of rotation of the bearing, said rollers having bores extending axially therethrough, a ring encircling the outer ends of said rollers and having an inner peripheral surface of a spherical concave curvature whose center is at said common apex, and a series of rotary antifriction elements arranged in a circle concentric with each of said rollers and interposed between and cooperating with the outer end of said roller and the spherically concave inner peripheral surface of said ring, a ring located opposite the inner ends of said rollers, and pins extending through the axial bores of said rollers and having headed outer ends seated in said first mentioned ring and threaded inner ends threaded into said second mentioned ring.

11. The combination set forth in claim 10 wherein said antifriction elements are in the form of balls and the outer ends of said conical rollers have annular raceways formed therein for said balls.

12. The combination set forth in claim 10 wherein said antifriction elements are in the form of rollers and annular raceways are provided therefor in the outer ends of said conical rollers.

JOHN W. RUNDT.

REFERENCES CITED

The following references are of record in the file of this patent:

UNITED STATES PATENTS

| Number | Name | Date |
|---|---|---|
| 2,057,213 | Skyiepal | Oct. 13, 1936 |

FOREIGN PATENTS

| Number | Country | Date |
|---|---|---|
| 407,368 | French | Feb. 26, 1910 |